June 6, 1933.  F. A. SMITH  1,913,005
SPARE WHEEL AND TIRE LOCK
Filed Jan. 28, 1932  4 Sheets-Sheet 3
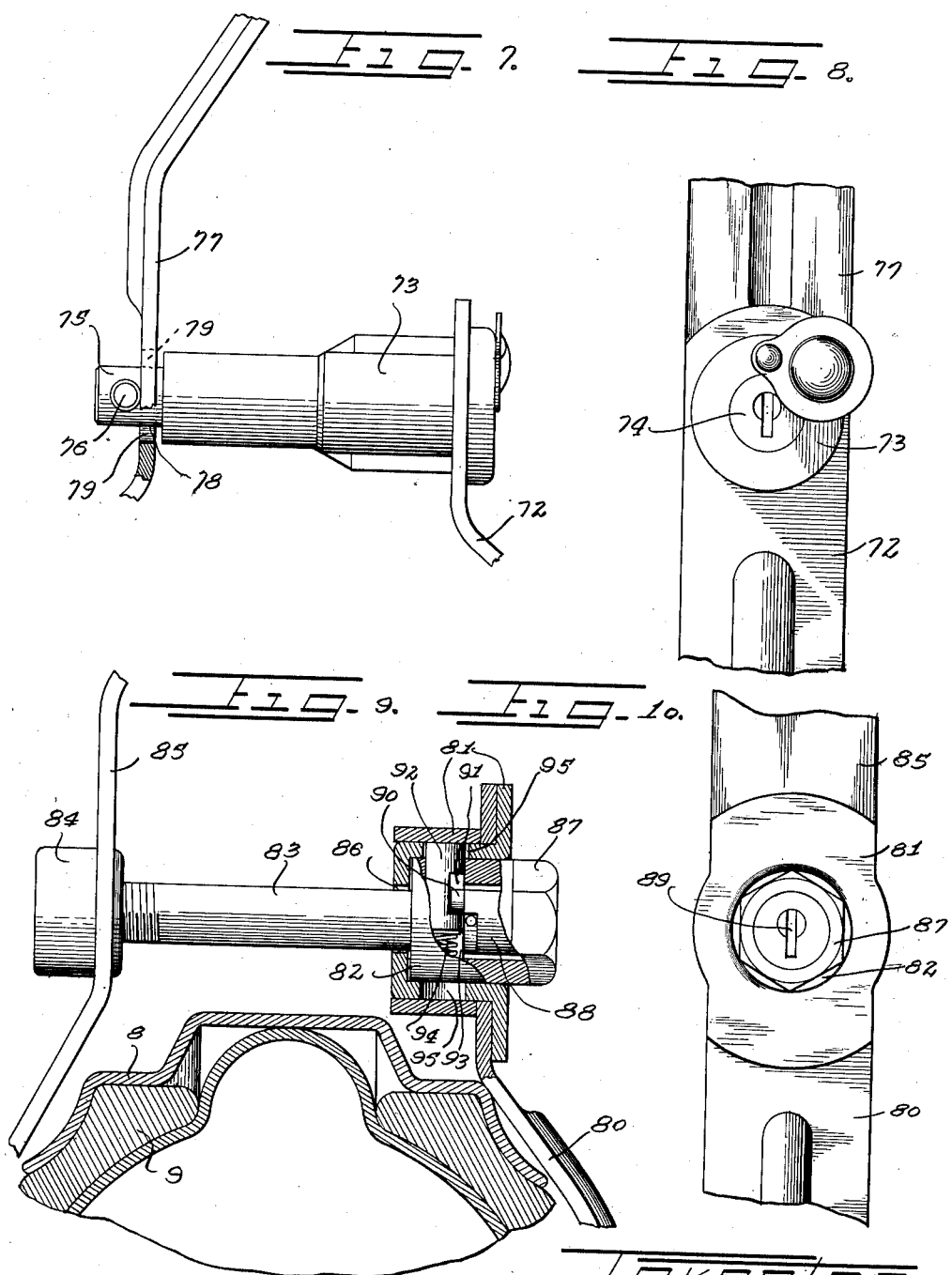
Inventor
Frederick A. Smith.
by Charles H. Wills

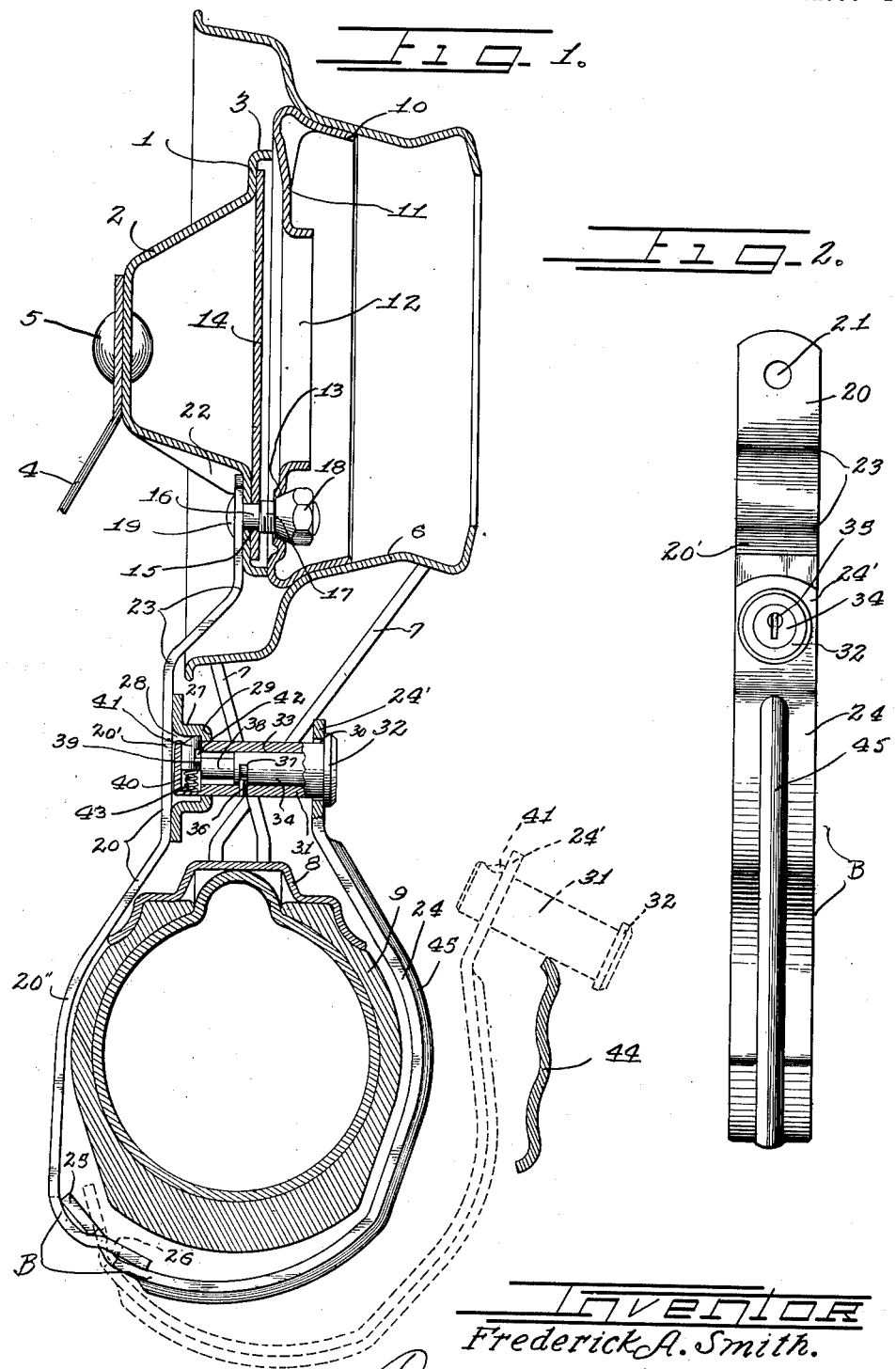

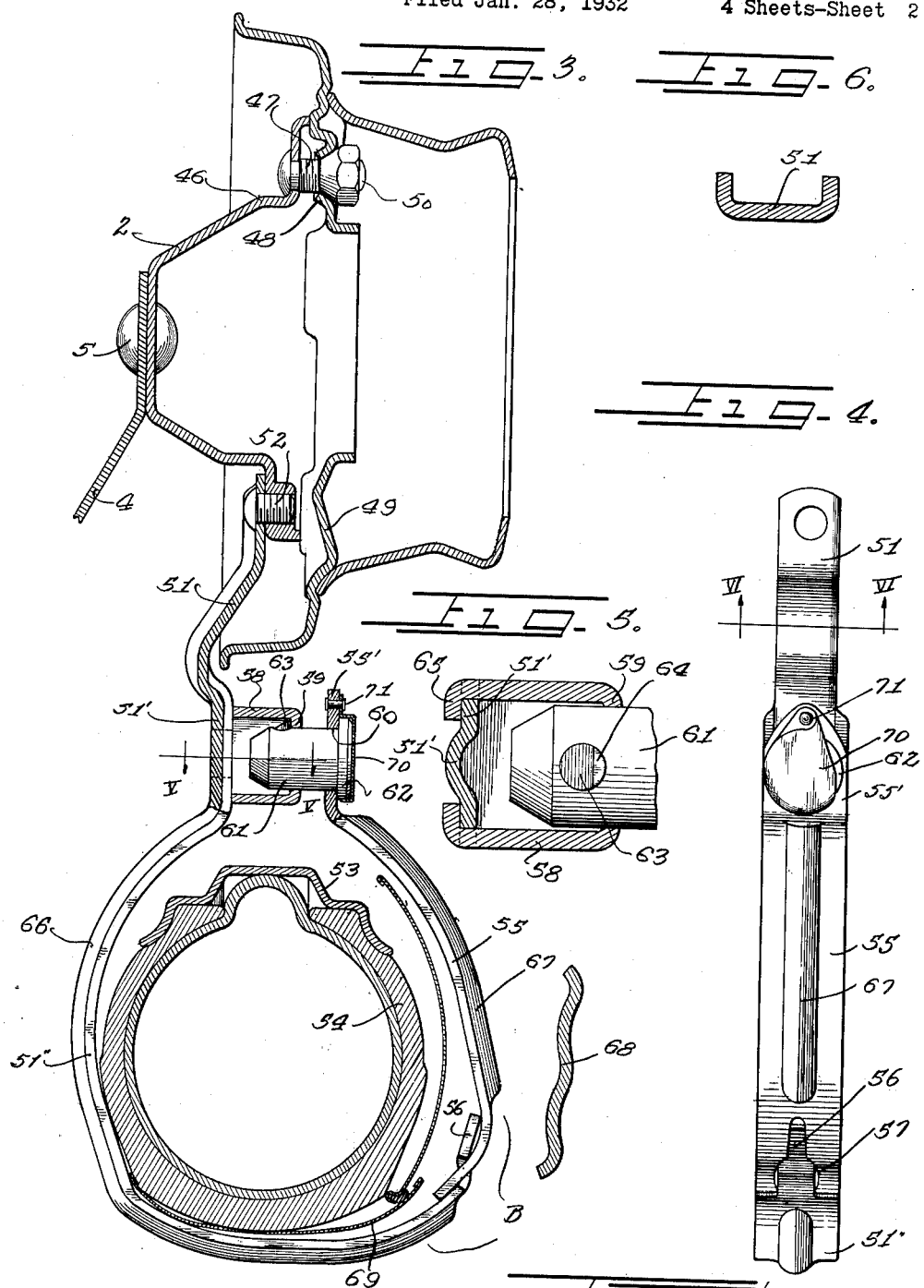

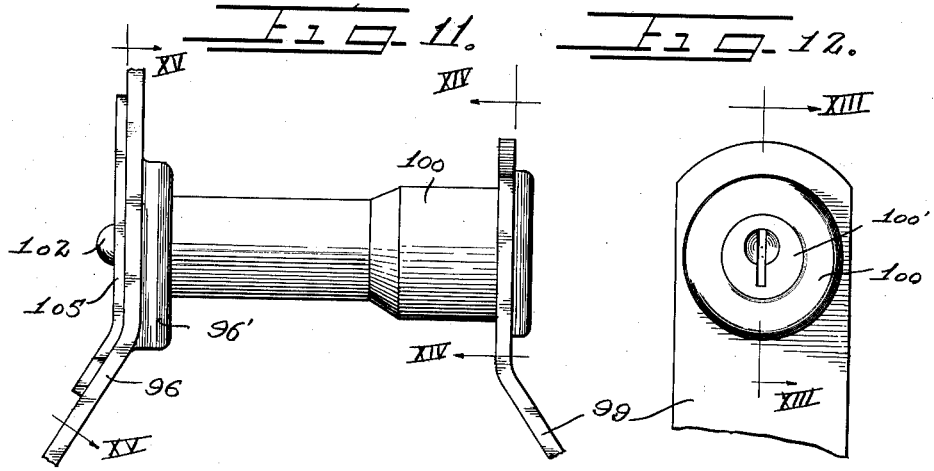
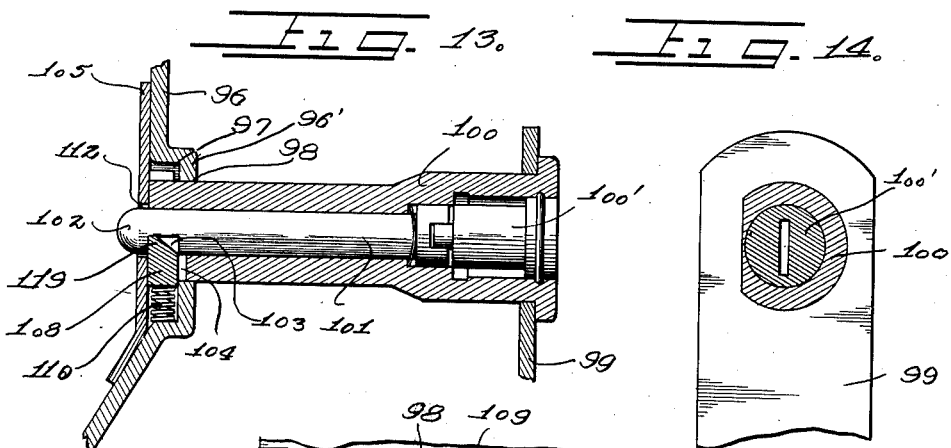
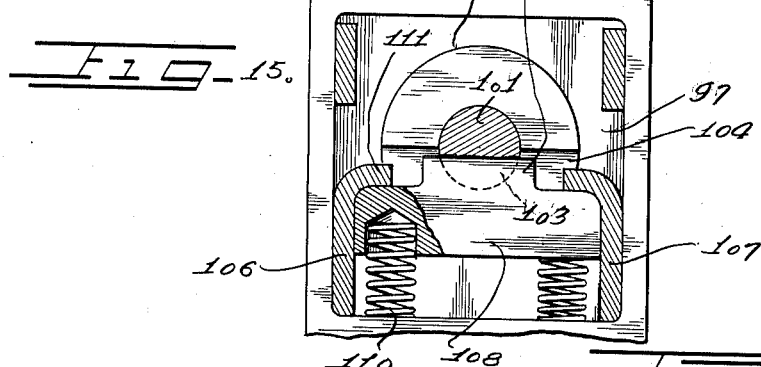

Patented June 6, 1933 1,913,005

UNITED STATES PATENT OFFICE

FREDERICK A. SMITH, OF NORTH CHICAGO, ILLINOIS, ASSIGNOR TO OAKES PRODUCTS CORPORATION, OF NORTH CHICAGO, ILLINOIS, A CORPORATION OF MICHIGAN

SPARE WHEEL AND TIRE LOCK

Application filed January 28, 1932. Serial No. 589,413.

This invention relates to a spare wheel and tire lock structure, and particularly to the strap or band type of locking structure designed to lock a spare wheel and tire to a carrier for preventing theft of both the wheel and the tire.

The main object of the invention is to provide a band or strap type lock structure designed particularly for application to wheels where the bolts or screws for mounting the wheel are concealed within the wheel hub structure.

A further object of the invention is to produce a band or strap structure having a loop for encircling the wheel tire and rim with one end of the band permanently secured preferably to that part of the wheel carrier which receives the wheel hub, and the other end of the band detachably secured, as by means of key-controlled lock mechanism, to the band at a point between the wheel rim and hub.

Another object is to produce a lock structure of this type in which the band may be a single piece of flexible metal such as steel, or may be of two pieces of rigid metal suitably hinged together at the loop so that the loop may be readily opened for reception of the wheel rim and tire.

Still another object of the invention is to so locate the wheel carrier on a vehicle that the loop of the locking band will be directly in front of the rear bumper of the vehicle in order that the bumper may serve as a rest and support for the outer hinged end of the band when such end is unlocked from the permanently secured part of the band.

The above enumerated and other features of the invention are shown incorporated in the structures disclosed on the drawings, in which drawings Figure 1 is a vertical section through a spare wheel carrier and a diametral section of a spare wheel mounted thereon, with the band locking structure in side elevation and the lock means therefore in section;

Figure 2 is a rear elevation of the band structure;

Figure 3 is a view similar to Figure 1 showing a modified structure and arrangement for the band element;

Figure 4 is a rear elevation of the band structure of Figure 3;

Figure 5 is an enlarged section on plane V—V of Figure 3;

Figure 6 is an enlarged section on plane VI—VI of Figure 4;

Figure 7 is a side elevation of the end of a strap structure showing a modified lock arrangement;

Figure 8 is a rear elevation of the structure shown in Figure 7;

Figure 9 is a side elevation, partly in section, of the upper ends of a band structure showing another modified construction and arrangement of lock means;

Figure 10 is a rear elevation of the parts shown in Figure 9;

Figure 11 is a side elevation of the upper end of a band showing another type of locking means;

Figure 12 is a rear elevation of the parts shown in Figure 11;

Figure 13 is a section on plane XIII—XIII of Figure 12;

Figure 14 is a section on plane XIV—XIV of Figure 11; and

Figure 15 is an enlarged section on plane XV—XV of Figure 11.

The carrier structure shown on Figure 1 comprises a carrier head in the form of a sheet metal plate or disc 1 having the forwardly extending frusto-conical deflection 2 and the rearwardly extending peripheral flange 3. This head may be rigidly supported on the back of a vehicle structure as by means of bracket structure 4 secured at its upper end to the head as by riveting 5.

The wheel structure shown comprises the sheet metal hub frame 6 from which spokes 7 extend to the supporting rim 8 for a pneumatic tire 9. Within the hub frame is secured an insert 10 providing the annular wall or flange 11 around a central opening 12, this flange having suitably placed holes 13 for the reception of bolts for securing the wheel to the hub structure on the vehicle axle.

The carrier plate 1 may be strengthened by a plate 14 secured against the front side of the plate to span the deflection part 2, and at the lower part of the carrier a hole 15 extends through the plates for receiving the reduced end 16 of a screw 17 extending rearwardly of the carrier head for engaging through one of the bolt holes 13 of the hub flange 11 when the wheel is applied to the carrier with the hub structure concentric with the carrier, the screw receiving one of the wheel supporting nuts 18, the wheel hub being thus secured to the carrier. If desired, a number of screws may extend from the carrier for receiving the corresponding bolt holes in the flange 11. The screws may be rigidly fastened to the carrier by riveting over the outer ends thereof as indicated at 19.

The lowermost screw 17 serves to support the inner member 20 of my improved lock band structure B. At its upper end the member 20 has the hole 21 receiving the end 16 of the lowermost screw, the screw end being then riveted over against the outer side of the band member. The deflected part 2 of the carrier head may be provided with the indentation 22 in its lower side into which the upper end of the band member 20 fits and the screw is thus assisted in rigidly holding the band member in alignment.

The band member 20 has the reverse bend 23 above its intermediate vertical section 20' in order to clear the front edge of the hub frame 6, and the lower section 20'' of the band member is deflected forwardly to extend around the front part of the tire at the lower part of the wheel.

The outer member 24 of the band structure B is substantially semi-circular to extend around the outer side and the bottom of the wheel tire and at their lower ends the band members are suitably hinged together so that the outer member 24 may swing relative to the inner member 20. In the arrangement of Figure 1, the hinge joint is formed by the T end 25 on the outer member 24 and the longitudinal slot 26 in the end of the member 2.

Secured to the outer side of the intermediate part 20' of the band member 20 between the wheel hub and rim is a detent frame 27 providing the cylindrical pocket 28 and the annular radially inwardly extending detent flange 29 at the outer end thereof and concentric with the pocket. The upper end 24' of the outer band member 24 is deflected outwardly so that it will be parallel with the intermediate section 20' of the band member 20 when the band members are in tire enclosing position as shown in full lines in Figure 1. The end 24' has the cylindrical opening 30 therethrough for receiving the cylindrical locking bar 31 having at its outer end a head 32 for engaging against the outer side of the end 24'.

The bar has the cylindrical bore 33 for receiving a lock barrel 34 which may be turned by means of a suitable key inserted in the key hole 35 in the outer end of the barrel. Suitable tumblers (not shown) may be employed in a manner well known in the art so that the barrel may be turned only by the proper key. The lock barrel is held against axial displacement in the bar 31 by means of a pin 36 extending into the circumferential slot 37 in the lock barrel.

Extending from the inner end of the barrel and rigid thereon is a stem 38 which is concentric with the barrel and from the outer end of which a pin 39 extends and located eccentrically of the stem. At the inner end of the bar 31 is a transverse guide passageway 40 for the detent bolt 41 which has the transverse slot 42 into which the eccentric pin 39 extends, the inner end of the locking bar being adapted to extend past the detent flange 29 into the pocket 28 of the detent frame 27. A spring 43 tends to shift the lock detent 41 outwardly to project its end behind the detent flange 29 in order to thus lock the bar 31 to the detent frame 27 and to hold the band member 24 in locking position in front of the tire and in locked position relative to the stationary band member 20. The outer end of the lock detent 41 is bevelled so that when the bar 31 is inserted into the detent frame 27 the detent will be cammed inwardly until it clears the detent flange 29 and then the spring will shift the detent outwardly with its end behind the flange to effect interlock between the bar 31 and the frame 27.

To release the lock, the proper key is inserted in the keyhole and the lock barrel turned to engage the eccentric pin with the lock detent and to retract the detent end from the detent flange, and then the outer band member 24 is free to be swung outwardly to open position indicated by the dotted lines in Figure 1. When the band is thus opened, a wheel to be carried is inserted into the open band and then its hub is applied to the carrier head and secured by one or more nuts 18. The outer band part 24 is then swung to carry the end of the lock bar 31 into the detent frame 27, and the lock snaps itself into locking position and thus secures and locks the upper end of the outer lock band 24 to the stationary band member 20 at a point between the wheel hub and the wheel rim. When the band is thus locked around the wheel tire and rim, it will be impossible to remove the wheel structure or to detach the tire therefrom.

The carrier head is preferably located so that the tire receiving loop of the band structure B will be in front of the rear bumper 44 which extends entirely across the rear part of the vehicle and is secured to the vehicle frame in any manner well known in the art. The bumper will serve as a protection for the lock band structure in case of collision or other impact, and the bumper also serves as a rest and a support for the outer swinging member 24 of the band structure when the band structure is in open position as indicated by dotted lines in Figure 1.

The lock bar 31 may be rigidly secured to the outer band member 24, or as indicated, it may be slidable through the opening 30 so that when the lock barrel is turned by the key to withdraw the detent 41 from the detent flange 29, the bar 31 may be shifted outwardly. The lock bar 31 may then be entirely withdrawn from the band structure or the detent 41 may be projected again before complete withdrawal of the bar so that the bar will be held against escape from the band member 24 by the engagement of the detent against the end 24″, the movement of the bar in the member 24 being then limited by the detent and by the bar head 32.

To strengthen the outer band member 24, it may have a longitudinal rib 45 and, if desired, the stationary band member 20 may be likewise strengthened.

In the arrangement shown in Figures 3 to 6 the carrier head structure 46 has one or more screws 47 extending therefrom for projecting through the holes 48 in the wheel hub bolt flange 49 to receive the securing nuts 50. The stationary member 51 of the locking strap structure B is secured to the carrier head independently of the hub receiving bolts, a bolt, screw or rivet 52 being shown as securing the member 51 at its upper end to the carrier head. The strap member 51 has the intermediate vertical section 51′ between the wheel hub and the wheel rim 53 and the lower end 51″ of the strap member extends around the front and bottom of the wheel tire 54 and conforms more or less in shape to the bottom of the tire for accurate engagement therewith.

The outer member 55 of the band structure is hinged at its lower end to the outer end of the member 51, the hinge connection comprising the T end 56 on the member 51 and the longitudinal slot 57 in the end of member 55.

The upper end 55′ of the hinge member 55 is deflected to be substantially parallel with the intermediate section 51′ of the member 51 when the band members are in locking position. Secured to the intermediate section 51′ is a detent frame 58 having the annular inwardly extending detent flange 59 at its outer end. In the opening 60 through the end 55′ of the hinge member 55 extends the lock cylinder 61 having the head 62 at its outer end. Within the lock cylinder is a lock barrel (not shown) rotatable by a suitable key to control the operation of the detent bolt 63 in the transverse slot 64 at the inner end of the lock cylinder so that when the lock cylinder is projected past the detent flange 59 into the detent frame 58 the detent bolt may be shifted outwardly to interlock with the flange and to lock the hinge member 55 to the stationary member 51 of the locking band structure.

As shown in Figure 5 the detent frame 58 may be rigidly secured to the member 51 by flanges or lugs 65 deflected around to engage against the rear side of the member 51. The member 51 may have a longitudinally extending strengthening rib 66 and the member 55 may be provided with a strengthening rib 67. The upper end of the band member 51 above its intermediate section 51′ may be of U-shaped cross section as shown in Figure 6.

The arrangement of the carrier structure is preferably such that the tire receiving end of the locking band is directly in front of the vehicle bumper 68 extending entirely across the vehicle and this bumper will serve as a rest for the hinged band member 55 when in open position and will also protect the band lock structure against tampering or in case of collision or impact. The band lock may also be shaped so that it will include the tire cover 69 which may be provided for the wheel tire, and the locking band will then serve to prevent theft of the tire cover as well as of the wheel and tire.

A closure plate 70 may be provided for the lock cylinder end for covering and protecting the keyhole after removal of the key from the lock barrel, and this cover plate may be pivoted by a pin 71 to the upper end of the band member 55 so that it may be readily swung laterally for insertion of the key.

In the arrangement of Figures 7 and 8, the outer or hinged member 72 of the locking band structure supports at its upper end a lock housing 73 within the outer end of which is a key controlled lock barrel 74 from which a locking bolt 75 projects through the housing and a distance beyond the inner end thereof where it is provided with a transversely extending lock bolt or lug 76. The member 77 of the lock band structure which is secured to the wheel carrier has an opening 78 for receiving the end of the bar 75 and has slots 79 extending laterally and at diametrically opposite sides from the opening 78. With this arrangement, when the hinged band member 72 is swung toward closing position and the bar 75 is turned to bring the detent lug 76 into alignment with the slot 79, the bar and lug may extend through the member 77 and when the bar 75 is rotated 90° by means of the lock key the lug 76 will engage against the rear side of the member 77 and thus lock the band members in enclosing position around the wheel rim and tire. A 90° turn of the bar 75 will then bring the lug 76 back into alignment with the slots 79 and the band member 72 is released for outward swing.

In the arrangement of Figures 9 to 10 the outer member 80 of the lock band structure has secured thereto a lock housing structure 81 for receiving the lock cylinder 82. This lock cylinder forms the head of a bolt 83 which is threaded at its outer end for engagement in a threaded block or nut 84 rigidly secured to the inner member 85 of the lock band structure. The bolt 83 is extended through the hole 86 in the inner wall of the lock housing structure 81 and the lock cylinder 82 has the outer polygonal end 87 for receiving a wrench or other tool for turning the bolt for cooperation with the nut 84.

Within the lock cylinder is a lock barrel 88 turnable by a suitable key inserted through the keyhole 89 and the lock barrel has the eccentric pin 90 extending from its inner end for engagement in the transverse slot 91 of a locking detent 92 shiftable in the transverse passageway 93 at the inner end of the lock cylinder, a spring 94 tending to force the detent bolt outwardly into a notch 95 provided in the lock housing structure 81. As shown, there may be one or more notches 95 and when the detent bolt engages in one of the notches, the bolt structure will be prevented from turning. When it is desired to lock the band sections around the wheel rim and tire the lock barrel is first turned by the key to withdraw the detent bolt from the notches 95 and the threaded end of the bolt is then applied to the nut 84 and by means of a wrench applied to the end 87 the bolt structure is turned into threaded engagement with the nut. The key is then turned to shift the detent bolt 92 into one of the notches 95 and it will then be impossible to turn the bolt structure.

In the arrangement of Figures 11 to 15, the intermediate part of the locking band member 96 has the outward deflection 96' providing a rectangular chamber 97 and the opening 98 in its inner wall. The outer band member 99 supports at its upper end a cylindrical lock housing 100 which at its outer end may be extended into the chamber 97 through the opening 98. At its outer end the lock housing supports a lock barrel 100' which it its inner end is coupled to a cylindrical lock bar 101 so that when the lock barrel is turned by means of a suitable key, the lock bar will be rotated in the housing 100. Just inside of the semi-spherical outer end 102 of the bar 101 it has a transverse detent notch 103 which is in alignment with the transverse notch or recess 104 in the adjacent end of the housing 100.

The chamber 97 is closed at its outer side by a plate 105 secured to the member 96 and this plate has guide walls 106 and 107 extending into the chamber 97 for guiding a detent bar 108 having the detent tongue 109 for cooperating with the detent slot 103 in the lock bar 101. Springs 110 urge the bar 108 toward the bar 101 and the movement of the bar 108 is limited by the overhanging ends 111 of the guide walls 106 and 107. To lock the wheel tire and rim the outer band member 99 is swung toward the stationary band member 96 and the end of the lock housing 100 is projected through the opening 98 into the chamber 97, the semi-spherical end of the lock bar 101 then engaging with the beveled surface of the detent tongue 109 on the lock bar 108 and the bar 108 will be depressed until the tongue 109 comes in registration with the detent notch 103 in the bar 101 and the detent tongue will then enter the notch and lock the bar 101 and the housing 100 against retraction. The plate 105 may have an opening 112 through which the end of the bar 101 may project. To unlock the band structure, the key is inserted in the key hole and the lock barrel and bar 101 are turned to bring the cylindrical part of the bar 101 into engagement with the detent tongue 109 and the bar 108 will then be depressed so that the bar in the lock housing may be withdrawn from the detent structure on the member 96.

My improved locking arrangement is particularly applicable to the more modern type of wire wheel or spoked wheel in which the mounting flange and bolts are concealed within the wheel hub structure, the locking band structure being suspended at one end from the wheel carrier to be intimately looped around the wheel rim and tire with readily accessible locking means for securing the free end of the band structure to the body part thereof intermediate the wheel hub and rim.

I do not desire to be limited to the exact construction and arrangement shown and described as changes and modifications may be made without departing from the scope of the invention as defined in the appended claims.

I claim as follows:

1. Supporting and locking structure for a spare wheel comprising in combination a carrier structure for receiving and supporting the hub of a wheel, a locking band looped to receive the rim and tire of a wheel mounted on said carrier structure, one leg of said band being secured to the carrier structure and the other leg of said band terminating below the carrier structure and the hub of a wheel thereon, means on the secured leg of the loop forming an annular detent wall and an opening surrounded thereby, said other leg having an opening through its end, a lock bar slidable in said opening of said other leg and having an abutment at its outer end, the inner end of said bar being adapted to be extended through said opening surrounded by said annular wall, a lock barrel in said bar and rotatable by a key, and detent means controlled by the rotation of said barrel to interlock said annular wall and the inner end of said bar.

2. In a spare wheel carrier and lock, the combination of a carrier structure for receiving and supporting the hub of a wheel, a lock band secured at one end to the carrier structure and forming a loop at its lower end for receiving the rim and tire of a supported wheel, a lock member on the secured end of the band at a point between the hub and rim of a supported wheel, and a companion lock member slidable transversely in an opening through the free end of said band, said lock members adapted for key control interlock to close the band loop around the rim and tire.

3. In a spare wheel carrier and lock, the combination of a carrier structure for receiving and supporting the hub of a wheel, a lock band secured at one end to the carrier structure and forming a loop at its other end for receiving the rim and tire of a supported wheel, the free end of said band having an opening therethrough, a lock cylinder having an abutment at its outer end and adapted to be shifted longitudinally in said opening, a key controlled lock barrel in said cylinder, means forming an annular abutment on the secured end of said loop at a point between the hub and rim of a secured wheel, said abutment being adapted to receive the inner end of said lock cylinder, and means controlled by the rotation of said lock barrel for interlocking said abutment and said cylinder.

4. In a spare wheel carrier and lock, the combination of a carrier structure for receiving and supporting the hub of a wheel, a lock band secured at one end to the carrier structure and forming a loop at its other end for receiving the rim and tire of a supported wheel, the free end of said band having an opening therethrough, a lock cylinder insertable through said opening and having an abutment head at its outer end, a lock barrel within said cylinder and a lock bolt, a spring tending to shift said lock bolt outwardly to project beyond the cylindrical surface of said cylinder, means controlled by the rotation of said lock barrel for retracting said lock bolt, said abutment head and said lock bolt normally limiting the shifting movement of said lock cylinder in said opening, and an annular abutment on the secured end of said lock band for receiving the inner end of said lock cylinder and to be engaged by said lock bolt when retracted for locking the free end of said band to the secured end thereof.

5. In a spare wheel carrier and lock, the combination of a carrier structure for receiving and supporting the hub of a wheel, a lock band secured at one end to the carrier structure and forming a loop at its other end for receiving the rim and tire of a supported wheel, the free end of said band having an opening therethrough, a locking bar having an abutment head at its outer end and shiftable through said opening, an abutment on the secured end of said band at a point between the hub and rim of a supported wheel, and key controlled locking means within said bar for interlocking the inner end of said bar with said abutment, said bar when unlocked from said abutment being shiftable outwardly to clear the loop for application of a wheel rim and tire therein.

In testimony whereof I have hereunto subscribed my name at North Chicago, Lake County, Illinois.

FREDERICK A. SMITH.